(12) United States Patent
Andersen et al.

(10) Patent No.: US 12,473,892 B2
(45) Date of Patent: Nov. 18, 2025

(54) METHOD FOR MOVING AN OBJECT BETWEEN A PLATFORM OF A WIND TURBINE AND A DECK OF A VESSEL AND FRAME STRUCTURE USED FOR COUPLING OF PULLING MEANS OR A PULLER

(71) Applicant: Siemens Gamesa Renewable Energy A/S, Brande (DK)

(72) Inventors: Erik Dahl Andersen, Vildbjerg (DK); John Harry Jensen, Klovborg (DK); Rene Schau Larsen, Brande (DK)

(73) Assignee: SIEMENS GAMESA RENEWABLE ENERGY A/S, Brande (DK)

( * ) Notice: Subject to any disclaimer, the term of this patent is extended or adjusted under 35 U.S.C. 154(b) by 0 days.

(21) Appl. No.: 18/438,774

(22) Filed: Feb. 12, 2024

(65) Prior Publication Data
US 2024/0183338 A1    Jun. 6, 2024

Related U.S. Application Data (62) Division of application No. 17/292,743, filed as application No. PCT/EP2019/077890 on Oct. 15, 2019, now Pat. No. 11,946,447.

(30) Foreign Application Priority Data

Nov. 16, 2018   (EP) ..................... 18206673

(51) Int. Cl.
*F03D 13/40* (2016.01)
*B63B 27/32* (2006.01)
(Continued)

(52) U.S. Cl.
CPC .............. *F03D 13/40* (2016.05); *B63B 27/32* (2013.01); *B66C 23/207* (2013.01); *F03D 13/25* (2016.05);
(Continued)

(58) Field of Classification Search
CPC ....... B66C 23/207; F03D 13/40; F03D 13/25; B63B 27/32; B63B 27/30;
(Continued)

(56) References Cited

U.S. PATENT DOCUMENTS 5,704,755 A * 1/1998 Jesperson ............... B66F 19/00
414/10
9,638,163 B2 * 5/2017 Holloway ............... B66C 13/08
(Continued)

FOREIGN PATENT DOCUMENTS

| DE | 10 2012 002720 A1 | 8/2013 |
|---|---|---|
| DE | 10 2013 107374 A1 | 1/2015 |

(Continued)

OTHER PUBLICATIONS

Restriction Mail date Feb. 6, 2023, U.S. Appl. No. 17/292,743, filed May 11, 2021, Confirmation No. 2916.
(Continued)

*Primary Examiner* — Moshe Wilensky
(74) *Attorney, Agent, or Firm* — Schmeiser, Olsen & Watts LLP (57) ABSTRACT

Provided is a method for moving an object between a platform of a wind turbine and a deck of a vessel, wherein the platform is located at a tower of the wind turbine, wherein the object is moved vertically by a hoist coupled between the object and at least one fixation site of the wind turbine located above the platform and the deck, wherein the object is deflected radially from the tower by a puller coupled between the object and the vessel.

18 Claims, 3 Drawing Sheets

(51) Int. Cl.
  *B66C 23/20* (2006.01)
  *F03D 13/25* (2016.01)
  *B63B 35/44* (2006.01)
(52) U.S. Cl.
  CPC ... *B63B 2035/446* (2013.01); *F05B 2230/604* (2013.01); *F05B 2230/6102* (2013.01)
(58) Field of Classification Search
  CPC ......... B63B 2035/446; F05B 2230/604; F05B 2230/6102; F05B 2230/61
  See application file for complete search history.

(56) References Cited

U.S. PATENT DOCUMENTS

| | | |
|---|---|---|
| 11,946,447 B2 | 4/2024 | Andersen et al. |
| 2017/0107736 A1* | 4/2017 | Lockwood ............ E04H 12/342 |
| 2021/0362987 A1* | 11/2021 | Svinth ................... B66C 23/185 |
| 2021/0396214 A1 | 12/2021 | Andersen et al. |

FOREIGN PATENT DOCUMENTS

| | | |
|---|---|---|
| EP | 2 531 400 A1 | 12/2012 |
| GB | 2 558 242 A | 7/2018 |
| WO | 2011/095316 A1 | 8/2011 |
| WO | 2012/108769 A1 | 8/2012 |

OTHER PUBLICATIONS

Response to Restriction Mail filed Apr. 6, 2023, U.S. Appl. No. 17/292,743, filed May 11, 2021, Confirmation No. 2916.
Office Action Mail date May 10, 2023, U.S. Appl. No. 17/292,743, filed May 11, 2021, Confirmation No. 2916.
Response to Office Action filed Aug. 7, 2023, U.S. Appl. No. 17/292,743, filed May 11, 2021, Confirmation No. 2916.
Final Office Action Mail date Aug. 15, 2023, U.S. Appl. No. 17/292,743, filed May 11, 2021, Confirmation No. 2916.
Response to Final Office filed Oct. 13, 2023, U.S. Appl. No. 17/292,743, filed May 11, 2021, Confirmation No. 2916.
Advisory Action Mail date Oct. 24, 2023, U.S. Appl. No. 17/292,743, filed May 11, 2021, Confirmation No. 2916.
RCE filed Nov. 15, 2023, U.S. Appl. No. 17/292,743, filed May 11, 2021, Confirmation No. 2916.
Notice of Allowance Mail date Dec. 6, 2023, U.S. Appl. No. 17/292,743, filed May 11, 2021, Confirmation No. 2916.
International Search Report and Written Opinion for PCT/EP2019/077890 Issued Jan. 31, 2020.

* cited by examiner

METHOD FOR MOVING AN OBJECT BETWEEN A PLATFORM OF A WIND TURBINE AND A DECK OF A VESSEL AND FRAME STRUCTURE USED FOR COUPLING OF PULLING MEANS OR A PULLER

CROSS-REFERENCE TO RELATED APPLICATIONS

This application is a divisional application of U.S. application Ser. No. 17/292,743, filed May 11, 2021, and entitled "METHOD FOR MOVING AN OBJECT BETWEEN A PLATFORM OF A WIND TURBINE AND A DECK OF A VESSEL AND FRAME STRUCTURE USED FOR COUPLING OF PULLING MEANS OR A PULLER", which claims priority to PCT Application No. PCT/EP2019/077890, having a filing date of Oct. 15, 2019, which is based on EP Application No. 18206673.8, having a filing date of Nov. 16, 2018, the entire contents all of which are hereby incorporated by reference.

FIELD OF TECHNOLOGY

The following relates to a method for moving an object between a platform of a wind turbine and a deck of a vessel, wherein the platform is located at a tower of the wind turbine. Furthermore, the following relates to a frame structure used for coupling of a pulling means or a puller.

BACKGROUND

Wind turbines comprise several components which are such large and heavy that a crane is required to lift them onto the wind turbine or to lower them from a wind turbine. For onshore wind turbines, a mobile crane can be moved to a position in the vicinity of the wind turbine. However, for offshore wind turbines, which are surrounded by the sea, a jack-up vessel, which can support itself on the bottom of the sea, is required for moving heavy components onto the wind turbine or for removing heavy components from the wind turbine, respectively. These movements of components can for instance be necessary during a service operation, wherein a faulty or defect component has to be replaced by another component. However, the limited availability of jack-up vessels, their complex employment as well as their high operation costs restrict the conduction of the service operations.

SUMMARY

An aspect relates to a method for moving an object between the platform of a wind turbine and a deck of a vessel that can be conducted with less effort, in particular without the use of a jack-up vessel.

According to embodiments of the invention, this problem is solved by a method as initially described, wherein the object is moved vertically by a hoist coupled between the object and at least one fixation site of the wind turbine located above the platform and the deck, wherein the object is deflected radially from the tower by a pulling means coupled between the object and the vessel.

This method has the advantage that the wind turbine itself is used as a crane, so that the need for an external crane can be eliminated. Furthermore, the usage of the wind turbine itself as a crane enables the lifting of heavy loads, since the tower of the wind turbine is more stable than for instance a crane mounted on top of the wind turbine. Since the object is moved vertically by the hoist coupled between the object and the wind turbine, a smaller vessel like a crew transfer vessel can be used for conduction of the method instead of a jack-up vessel. Smaller vessels like a crew transfer vessels have a higher availability than jack-up vessels and their usage is less costly. By reducing both the expenditure of time and the costs, for instance an exchange of a component of the wind turbine can be conducted quicker and more effectively, so that for instance a down time of the wind turbine can be reduced advantageously.

Offshore wind turbines are surrounded by water, so that the vessel can be either anchored in the vicinity of the wind turbine or it can be fixed to the tower to enable the radially deflection of the object using the pulling means coupled between the object the vessel. By the inventive method, the object can both be moved from the platform of the wind turbine to the deck of the vessel and from the deck of the vessel to the platform of the wind turbine. During the movement of the object, the object can be moved vertically, or lifted and/or lowered, respectively, by the hoist coupled between the object and the wind turbine. Additionally, the object can be deflected radially by the pulling means, which is coupled between the object and the vessel. The hoist for moving the object vertically is attached to the wind turbine at a fixation site above the platform, so that the object positioned on the platform can be lifted upwards. A lifted object can be lowered again also by the hoist, in particular after a deflection or a radially movement of the object, respectively.

By the pulling means, which is coupled between the object and the vessel, the object can be deflected radially from the tower, so that the object can be moved out of its gravitational equilibrium position, comparable to the deflection of a pendulum. Hence, by the pulling means, the object can be deflected or moved away from the tower. Vice versa, a lifted and deflected object can be moved towards the tower by subsequently releasing the pulling means moving the object towards the equilibrium position.

The platform of the wind turbine can be arranged on the lower end of the tower of the wind turbine above the sea level, so that the platform is generally higher than the deck of the vessel floating on the sea. However, it is also possible to move the object between a platform and a deck that is higher than the platform.

In an embodiment, the object is moved from the platform to the deck of the vessel by lifting it from the platform using the hoist, deflecting it towards the vessel by pulling the pulling means from a state of minimum deflection in a state of maximum deflection and lowering the object on the deck of the vessel by using the hoist or the object is moved from the deck of the vessel to the platform by lifting it from the deck of the vessel using the hoist, moving the object towards the tower by releasing the pulling means from a state of maximum deflection to a state of minimum deflection. In an embodiment the object may then further be lowered to the platform by using the hoist.

For moving an object from the wind turbine to the deck of the vessel, the object can be positioned on the platform of the wind turbine. An object, for instance a transformer of the wind turbine, can be located inside the tower at the same level as the platform of the wind turbine. In this case, the object can be moved on the platform, for instance by using rails to move the object from the inside of the tower to the platform on the outside of the tower. It is also possible that the object is lifted to the platform for instance from a nacelle of the wind turbine and/or through the inside on the tower on a height level equal to the platform so that it can be moved onto the platform afterwards.

The object positioned on the platform is then coupled to a hoist, wherein the hoist is coupled to at least one fixation site of the wind turbine, wherein the fixation site is located above the platform. Additionally, the object is coupled to the pulling means and the pulling means is coupled to the vessel, or vice versa. The object can then be lifted using the hoist, so that it is moved upwards and towards the fixation site on the wind turbine. For bridging the horizontal distance between the platform and the deck of the vessel, the lifted object can be deflected radially, that means towards the vessel, by pulling the pulling means, so that the lifted object deflects and is moved towards the vessel.

Thereby, the pulling means is pulled from a state of minimum deflection to a state of maximum deflection. The state of minimum deflection can be a state of no deflection, if the object is located vertically underneath the fixation site. However, if the object is located for in a radially more outward compared to the fixation site, the state of minimum deflection can also include a deflection equal to the radially distance between the object and the fixation site, so that an unintended movement of the lifted object towards the tower and/or a contact between the lifted object and the tower can be prevented. The state of minimum deflection corresponds to a position of the object above its assigned position on the platform or its actual position on the platform, respectively. Consequently, the state of maximum deflection corresponds to a deflection of the object to a position above its assigned position on the deck of the vessel or its actual position on the deck of the vessel.

After deflecting, the lifted and maximally deflected object is placed above its assigned position on the deck of the vessel. The object can then be lowered and placed on the deck of the vessel using the hoist. It is possible, that during the deflection movement using the pulling means, the object is already lifted and/or lowered to enable a smooth movement and/or to decrease a distance between the object and the deck of the vessel or the platform during the deflection movement.

In a vice versa movement, wherein an object placed on the deck of the vessel is moved to the tower and the object may further be lowered on the platform of the wind turbine, the object placed on the deck of the vessel is coupled to the pulling means, wherein the pulling means is coupled to the vessel. Additionally, the object is coupled to the hoist, wherein the hoist is also coupled to the at least one fixation site of the wind turbine. In this configuration, the pulling means is already in a state of maximum deflection keeping the object in its deflected position once it has been lifted by the hoist, so that a quick and uncontrollable movement of the lifted object towards the wind turbine can be prevented. By subsequently releasing the pulling means from its state of maximum deflection to a state of minimum deflection, the object can be moved towards the wind turbine. During the movement of the object towards the wind turbine, it is possible that the object is subsequently lifted and/or lowered using the hoist, so that the object is located above the platform once the pulling means reaches its state of minimum deflection. From this position, the object can be placed on its assigned position on the platform by lowering it using the hoist.

In particular, it is possible that first an object is moved from the platform to the deck of the vessel and afterwards another object, for instance as a replacement for the first object, is moved from the deck of the vessel on the platform so that an exchange of the object can be performed.

Alternatively to the previously discussed scenario, the object may not be moved onto or from a platform, as mentioned before, but may be left hanging from a connection point along the tower and will not be positioned on the platform. This may be advantageous if for example a temporary blade working platform may be put into hanging position directly from the vessel without lifting parts of the temporary blade working platform first to the platform for assembly. In a first option of an embodiment, the object is moved from a hanging position, hanging from the nacelle via a further hoist, to the deck of the vessel by positioning it with a distance above the platform using the hoist, removing a tension from the further hoist, deflecting the object towards the vessel by pulling the pulling means from a state of minimum deflection in a state of maximum deflection and lowering the object on the deck of the vessel by using the hoist. In a second option of an embodiment, the object is moved from the deck of the vessel to the platform by lifting it from the deck of the vessel using the hoist, moving the object towards the tower by releasing the pulling means from a state of maximum deflection to a state of minimum deflection, and moving the object to its hanging position, hanging from the nacelle, by releasing the hoist and tensioning the further hoist. Thus, the further hoist may be in place, as long as the object is present at the wind turbine.

In an embodiment, at least one fixation site located at a nacelle of the wind turbine arranged on the top of the tower of a wind turbine is used. That means the hoist or the further hoist may be fixed to the nacelle or a component within the nacelle. Since the nacelle protrudes radially from the top of the tower of the wind turbine, the object can be lifted slightly spaced from the tower using the hoist, so that damage to the tower, for instance damage to an outer wall and/or a painting of the tower, can be avoided. Also, as being the top part of the wind turbine, the nacelle is located above the platform. As at least one fixation site, for instance a frame which bears a cover of the nacelle, like a bedframe of the nacelle located on the bottom side of the nacelle, can be used. In particular, the fixation site can be a structure like a strut or a frame of the nacelle, which allows the coupling of the hoist to the nacelle. The hoist can be coupled to more than one fixation site to enable a support of heavier objects to the tower.

In an embodiment of the invention, a crane arranged in or at the nacelle and/or at least one fixation element mounted to or comprised by a bedframe of the nacelle is used as at least one fixation site. A nacelle of a wind turbine often comprises a crane, which allows lifting of objects onto the nacelle. A hoist used for lifting the object can be coupled to such a crane. Additionally, or alternatively, the hoist can be coupled to at least one fixation element mounted to or comprised by a bedframe of the nacelle. In particular, the hoist is coupled to a plurality of fixation sites, for instance to a plurality of fixation elements like hooks or loops, which can be mounted to the bedframe of the nacelle or which are already comprised by the bedframe of the nacelle, so that the lifting of comparatively heavy objects using the hoist coupled to the fixation sites is enabled. It is also possible, that the hoist is coupled to both the crane and to at least one additional fixation sites like additional fixation elements so that a lifting of objects, which are heavier than a maximum load of the crane, is enabled.

In an embodiment, a circumferential position of the object with respect to the platform and/or the deck of the vessel is adjusted by yawing the nacelle. An object, which has to be lifted by the hoist, can be adjusted in a circumferential position by yawing the nacelle or rotating the nacelle, respectively. By such a yawing or rotating of the nacelle, the nacelle is turned around the longitudinal axis or the height of the tower, respectively, so that the circumferential position of the lifted object can be corrected. The yawing of the nacelle can be performed for instance prior to or during a deflection movement of the object from or towards the tower. The yawing or rotating of the nacelle can be conducted by electrical actuators, which are able to rotate the nacelle with respect to the tower. By such an adjustment of the circumferential position of the object, for instance a load on the hoist and/or on the pulling means can be reduced and/or a precise positioning of the object on the platform of the deck of the vessel, respectively, can be facilitated.

In an embodiment, as hoist, an electrically actuated chain hoist is used. The chain hoist comprises for instance an electrical motor, which can lift or lower an object attached to a chain of the chain hoist by moving the chain. The chain hoist can be coupled to the at least one fixation site and/or the object using one or more coupling means or a coupler like ropes, chains, slings, shackles and/or snap hooks. By actuating the chain hoist, the object coupled to the chain hoist can be lifted or lowered. The chain hoist can be for instance coupled electrically to the vessel, so that the chain hoist can be powered for instance by a generator of the vessel. The chain hoist or any coupling means coupled to the chain hoist and/or the fixation site can be moved towards the fixation site for instance by using a crane of the nacelle of the wind turbine.

In an embodiment, the pulling means is guided by at least one frame element arranged on the deck of the vessel spacing the pulling means from the deck of the vessel. By spacing the pulling means from the deck of the vessel, a vertical movement or a lifting of an object positioned on the deck of the vessel is possible. Additionally, a precise positioning of the lifted object on an assigned position on the deck of the vessel is possible. In particular when moving objects, which are too heavy to be manually moved, a precise positioning of the object on the deck of the vessel is desirable for a subsequent transport of the object using the vessel. Also, vice versa, during a movement of an object from the deck of the vessel to the tower and further to the platform of the wind turbine, a pulling means spaced from the deck of the vessel using the frame element can be easily coupled to the object and facilitates the movement of the object towards the tower of the wind turbine by subsequently releasing the pulling means.

The frame element can be arranged on the deck in such manner, that the position of the deck, in which the object is located or to which the object shall be moved, lies in between the frame element and the platform of the wind turbine. The pulling means can be attached to the frame element, wherein the frame element is attached to the deck of the vessel, so that the pulling means is coupled to the vessel. It is also possible, that the pulling means guided by the at least one frame element and that is attached to the vessel, for instance to the deck of the vessel.

In an embodiment of the invention, as pulling means one or more ropes and/or cables coupled to at least one winch are used, wherein the at least one winch is coupled to the frame structure and/or the deck of the vessel. The at least one winch can be for instance a part of the frame element and/or a part of the vessel. By winding the one or more ropes and/or cables on the at least one winch, a lifted object can be deflected radially from the tower to the vessel. Vice versa, by unwinding the at least one rope and/or cable from the winch, the pulling means can be released, so that a lifted and deflected object is moved towards the tower of the wind turbine due to gravity acting on the deflected object.

In an embodiment, the one or more ropes and/or cables are guided by at least one pulley arrangement of the frame element. By using at least one pulley arrangement of the frame element to guide the one or more ropes and/or cables, a deflection of heavier objects using the at least one winch is facilitated. The pulley arrangement can comprise a plurality of rolls, which are fixed to the frame structure, and a plurality of moveable rolls for forming a pulley for each of the at least one ropes and/or cables or the pulling means, respectively.

In an embodiment, the object comprises at least one coupling means on its topside or at least one coupling means is arranged on and fixed to a topside of the object, wherein the hoist and the pulling means are coupled to the object by fixing them to the at least one coupling means. The at least one coupling means can be for instance a part of the object and/or at least one coupling means can be fixed to the topside of the object, wherein the at least one coupling means allows the coupling of the object to both the hoist and the pulling means, for instance by providing a mutual fixation point.

The at least one coupling means can be a hook, a loop, a rope, a cable, a chain, a sling, a shackle and/or a snap hook. In particular, a plurality of coupling means can comprise any combination of such elements. For facilitating the movement of the object and for avoiding unintended twisting or rotation of the object during the movement, for instance a coupling means can be coupled to each corner of the topside of the object. The coupling means can form a mutual fixation points for coupling of both the hoist and the pulling means. It is also possible that the hoist and the pulling means are coupled to the object by different coupling means.

In an embodiment of the invention, at least one alignment means or at least one alignment is attached to a bottom side of the object, wherein a rotational orientation of the lifted object is adjusted using the at least one alignment means. The alignment means can be for instance a rope or a cable, which can be coupled between the bottom side of the object and either the vessel or the platform. It is also possible, that a rope or a cable as alignment means is manually operated by one or more workers stationed on the platform and/or the deck of the vessel. By pulling the rope or the cable, a rotational orientation of a lifted object can be adjusted easily facilitating the precise positioning of the object on its assigned position on the platform and/or the deck of the vessel, respectively.

In an embodiment, as object, a transformer unit of the wind turbine is moved. It is also possible, that as object another component of the wind turbine, for instance components with a weight between 1 ton and 20 tons, are moved.

As an alternative example, also as object, an auxiliary platform segment can be moved. An auxiliary platform segment may be an extension element for the present platform, for example to provide a blade working platform which then can be used as a platform for personnel or goods needed in case of blade maintenance.

A frame structure according to embodiments of the invention is used for coupling of a pulling means adapted to be used in a method according to embodiments of the invention and comprises a frame element, wherein the frame element comprises an A-shaped or a H-shaped or a trapezoidal cross section and a fixation arrangement, wherein the fixation arrangement is attached or attachable to at least one freight container. By the frame elements, the pulling means can be coupled to the vessel by guiding the pulling means on or through the frame element, wherein the frame element is coupled or attached to the deck of the vessel. For attaching the frame element to the deck of the vessel, the frame element comprises a fixation arrangement, which is attached or attachable to at least one freight container, like for instance a 24 feet container or another kind of standard freight container. The usage of a freight container for attaching the frame element of the frame structure has the advantage, that a freight container can be attached to the deck of the vessel using standard fixation means provided for the attachment of freight containers. Additionally, by attaching the frame element onto the freight container, the height of the frame element can be increased, so that in total a smaller frame element can be used facilitating in particular a transport of the frame element. Therefore, the fixation arrangement can be arranged for instance on a bottom side of the frame element, for instance on the two feet of an A-shaped or an H-shaped frame element or on the bottom edge of a frame element with a trapezoidal cross section.

In an embodiment, the frame structure comprises at least one pulley arrangement and/or at least one winch. The pulley arrangement can comprise a plurality of fixed ropes and movable ropes forming a pulley arrangement for one or more ropes or cables used as pulling means. Additionally, or alternatively, the frame structure can also comprise at least one winch, which allows a winding or unwinding of the least one rope or cable used as pulling means in order to achieve the deflection movement of the object and/or the release of the pulling means.

BRIEF DESCRIPTION

Some of the embodiments will be described in detail, with reference to the following figures, wherein like designations denote like members, wherein.

DETAILED DESCRIPTION

Figure 1:
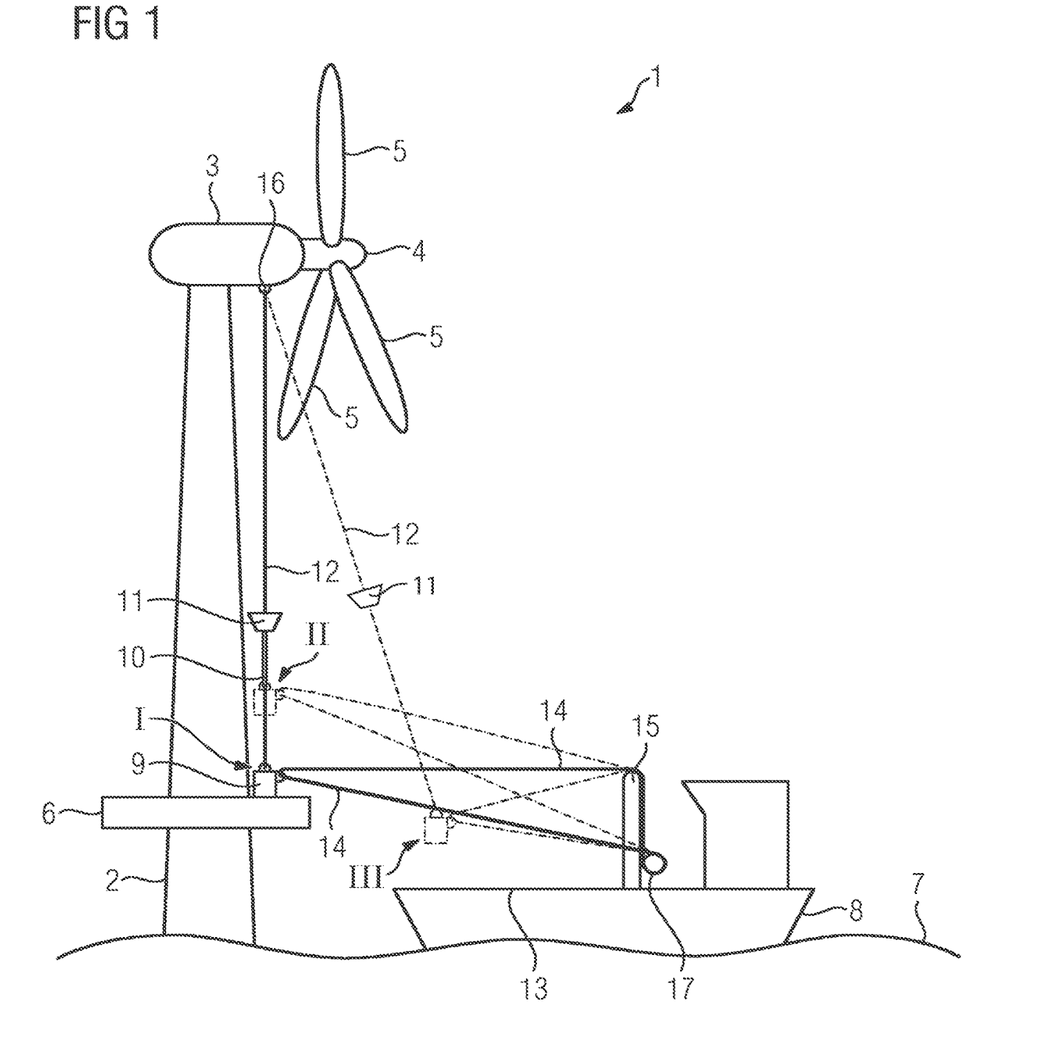
FIG. 1 depicts a side view of an object moved between a wind turbine and a deck of a vessel.

FIG. 1 depicts an offshore wind turbine 1 comprising a tower 2 and a nacelle 3. To the nacelle 3, a hub 4 is attached bearing three rotor blades 5 of the wind turbine 1. The wind turbine 1 comprises a platform 6 arranged at a lower end of the tower 2 of the wind turbine 1. As an offshore wind turbine 1, the wind turbine 1 is surrounded by the sea 7, wherein the surface of the sea 7 is below the platform 6.

A vessel 8 is floating on the sea 7 in the vicinity of the wind turbine 1. The vessel 8 may be anchored or attached to that wind turbine 1. On the platform 6 of the wind turbine 1, an object 9 is arranged. The object 9 is coupled by a chain 10 to a chain hoist 11, wherein the chain hoist 11 is coupled by a coupling means 12 to the nacelle 3 of the wind turbine plate. Both the coupling of the object 9 to the chain hoist 11 and the coupling of the chain hoist 11 to the nacelle 3 are described later in more detail.

The object 9 can be for instance a transformer unit of the wind turbine 1, which shall be moved from the platform 6 on a deck 13 of the vessel 8. Generally, the platform 6 is higher than the deck 13 of the vessel so that this situation is described in the following embodiment. However, it is also possible to move the object 9 between a platform 6 that is higher than the deck 13 using respective lifting and/or lowering movements of the object 9.

The object 9 is coupled to a pulling means 14, which is coupled to the vessel 8 by a frame structure 15, wherein the coupling of the object to the pulling means 14 and the frame structure 15 are discussed later in more detail.

In a first step of an embodiment of a method for moving an object between the platform 6 of the wind turbine 1 and the deck 13 of the vessel 8, the object 9 is arranged on the platform 6 of the wind turbine 1 in position I. The object 9 is coupled by the chain hoist 11 to a fixing site 16 located above the platform 6 and the deck 13 on the nacelle 3 of the wind turbine 1. Furthermore, the object 9 is coupled to the pulling means 14, wherein the pulling means 14 is coupled to the vessel 8. The pulling means 14 is in a state of minimum deflection as long as the object is in position I.

To avoid an unintended contact of the object 9, the chain 10, the chain hoist 11 and/or the coupling means 12 to one of the rotor blades 5 of the wind turbine 1, the rotor blades 5 can be moved into a position, wherein one of the rotor blades protrudes from the hub 4 in a vertical upwards direction. This maximizes the distance between the coupling means 12, or the chain hoist 11, respectively, to the lower pair of rotor blades 5.

For moving the object 9 from the platform 6 of the wind turbine 1 to the deck 13 of the vessel 8, the object 9 is lifted by the chain hoist 11 in vertical direction towards the fixation site 16 into position II, wherein the object 9 is supported by the tower 2 of the wind turbine 1. Once the object 9 has been lifted from the platform 6, the object 9 can be deflected in a direction radially outwards from the tower 2 of the wind turbine 1 or towards the vessel 8, respectively. The object 9 can be deflected by pulling the pulling means 14. In this embodiment, the pulling means 14 comprises two ropes, which are wound up on a winch 17 of the frame structure 15. The object 9 lifted to the position II can be moved to the position III by pulling the pulling means 14. During this deflection movement, the object 9 can be lowered using the hoist to subsequently reduce a distance between the object 9 and the deck 13 of the vessel 8. It is possible that a circumferential position of the object 9 in position II and/or in position III is adjusted by yawing the nacelle. This allows to move the object for instance closer to the deck 13 of the vessel 8 and/or to reduce strain in the pulling means 14.

Figure 2:
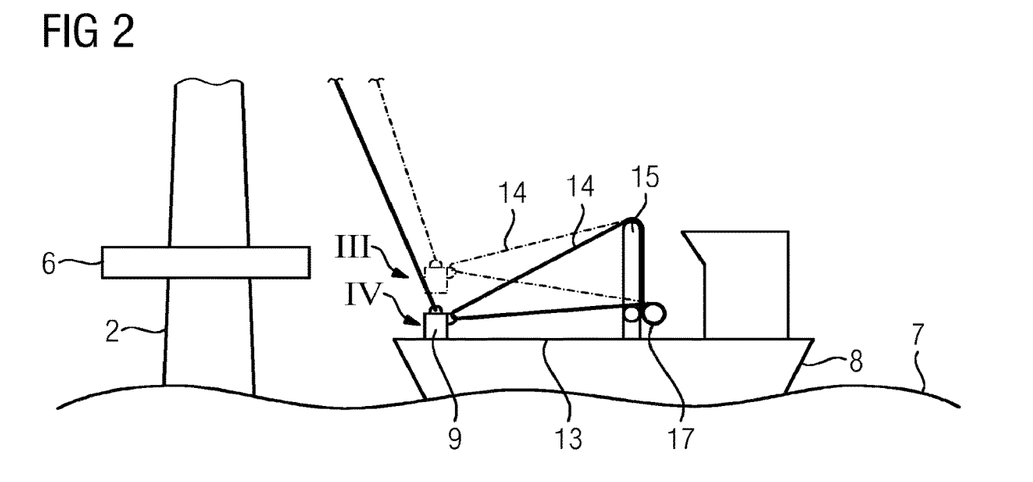
FIG. 2 depicts a further side view of an object moved between a platform of a wind turbine and a deck of a vessel.

As it is discernible from FIG. 2, the object 9 can be moved from the position III to the position IV by lowering it using the chain hoist 11. When the object 9 is in position IV, the pulling means 14 is in its state of maximum deflection. Once the object 9 has been placed on the deck 13 of the vessel 8, it can be decoupled from the chain hoist 11 and from the pulling means 14.

Vice versa, also a movement of the object 9 from the deck 13 of the vessel 8 to the tower 2 and further to the platform 6 of the wind turbine 1 is possible. Therefore, an object placed at position IV on the deck 13 of the vessel 8 is attached to the pulling means 14, wherein the pulling means 14 is in this situation in a state of maximum deflection. The object 9 is also coupled to the chain hoist 11 and to the fixation site 16 as described in relation to FIG. 1. Starting from position IV, the object 9 is lifted by the chain hoist 11 into position III. Once the object 9 has been lifted, the pulling means 14 can be continuously released, to move the object 9 towards the tower 2 of the wind turbine 1 into position II. In this case, due to the initial deflection of the object 9 towards the fixation site 16, the object 9 can be moved towards the tower because of the gravity acting on the object 9.

The pulling means 14, which comprises two ropes, is wound up partly on the winch 17 in its state of maximum deflection. To move the object 9 towards the tower 2 of the wind turbine 1, the ropes of the pulling means 14 are released continuously from the winch 17. From position III to position II, the object is moved by further releasing the pulling means 14 and by lifting the object 9 using the chain hoist 11. Once the object has reached the position II, it can be lowered on the platform 6 into position I using the hoist 11.

If the fixation site 16 is located vertically above the position of the object 9 on the platform 6, the pulling means 14 is in a state of no deflection when the object 9 is in the position II and/or in the position I, wherein the pulling means 14 does not create a force acting on the object 9. It is also possible, that the fixation site 16 is not located directly vertically above the position of the object 9 on the platform, so that in position II and/or in position I, the pulling means 14 already exerts a force on the object 9 in its state of its minimum deflection spacing the object 9 from the tower 2 to avoid contact between the object 9 and the tower 2.

It is in particular possible, that first an object 9 is moved from the platform 6 to the deck 13 of the vessel 8 and afterwards another object 9 is moved from the deck 13 of the vessel 8 to the platform 6 to the wind turbine 1, or vice versa. This enables for example the exchange of a transformer unit of the wind turbine 1.

It should be noted that the frame structure 15 can have height higher than the position of the platform 6, as it is shown in FIG. 1 and FIG. 2, but this is not required. The platform 6 can have a position higher than the height of the frame structure 15, for example two to three times higher.

As an alternative example and not shown in the figures, also an auxiliary platform segment can be moved instead of a transformer. An auxiliary platform segment may be an extension element for the present platform, for example to provide a temporary blade working platform which then can be used as a platform for personnel or goods needed in case of blade maintenance. This may be helpful, if the platform 6 is not sized to provide sufficient space for blade maintenance work or if the platform 6 is not suitable for maintenance work for other technical reasons, e.g. being static placed at the bottom of the tower.

The auxiliary platform segment may be pre-assembled on the vessel. After such preparation, the blade working platform as the auxiliary platform can be hoisted up to the tower on the platform 6 in the same way as explained for the exchange of a transformer. Alternately the blade working platform will not be placed on the platform 6 but simply connected to a further hoist, so that the blade working platform will be guided directly to a hanging position, hanging from the nacelle.

One difference to moving a transformer may be that the auxiliary platform may itself carry winches and/or motors—as these may be used later for blade maintenance work, so the auxiliary platform can hoist itself up the tower by using the winches and/or motors of the auxiliary platform. Another difference may be that the auxiliary platform does not necessarily need to be placed on the platform 6 due to wires, ropes or chains provided for carrying the auxiliary platform from attachment points, desirably in or at the nacelle, and cooperating with the winches and/or motors of the auxiliary platform.

Figure 3:
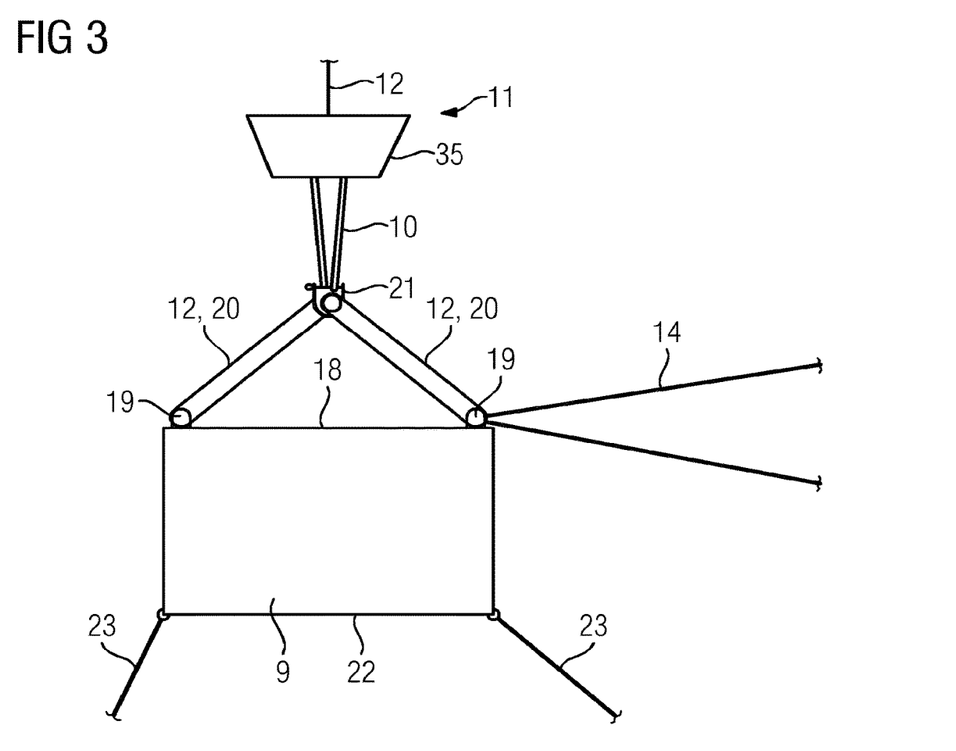
FIG. 3 depicts a side view of an object coupled to a hoist and a pulling means.

In FIG. 3, the coupling of the chain hoist 11 and the coupling means 14 to the object 9 is depicted. The chain hoist 11 comprises an electrical machine 35, which can be used to actuate the chain 10, so that the object 9 coupled to the chain 10 is moved upwards or downwards, or is lifted or lowered, respectively. The chain hoist 11 is coupled to the coupling means 12, wherein the coupling means 12 is coupled to the fixation site 16 on the wind turbine 1 as explained later in correspondence to FIG. 4. The chain 10 of the chain hoist 11 is coupled by two coupling means 12 to a topside 18 of the object 9. Each coupling means 12 comprises a loop 19 attached to the top surface 18 and the object 9 as well as a rope 20, which are coupled together using a shackle 21. The shackle 21 also coupled to the chains 10 of the chain hoist 11. Additionally, or alternatively to the ropes 20, also chains, slings, belts or other types of coupling means can be used. Instead of the loops 19, also hooks, shackles or snap hooks can be used.

It is possible, that more than two coupling means 12 are used to couple the object 9 to the chain 10 of the chain hoist 11. For instance, an object with a rectangular topside 18 can be coupled by using a coupling means 12 coupling each of the edges of the topside 18 to the chain 10 of the chain hoist 11. In this embodiment, the pulling means 14 is also coupled to one of the loops 19 arranged on the topside 18 of the object 9. It is also possible that the pulling means 14 is coupled to one or more corners of a bottom side 22 of the object 9 or that it is coupled also to the shackle 21, wherein the shackle 21 forms a mutual fixation point for both the chain 10 of the chain hoist 11 and the pulling means 14.

To adjust the orientation of the object 9, two adjustment means 23 are attached to corners of the bottom side 22 of the object 9. These adjustment means 23 can be for instance ropes, which are pulled manually by workers on the platform 6 and/or on the deck 13 of the vessel 8. By using these adjustment means 23, the orientation of the object 9 can be adjusted, so that it can be precisely be positioned in its assigned position on the platform 6 or the deck 13, respectively.

Figure 4:
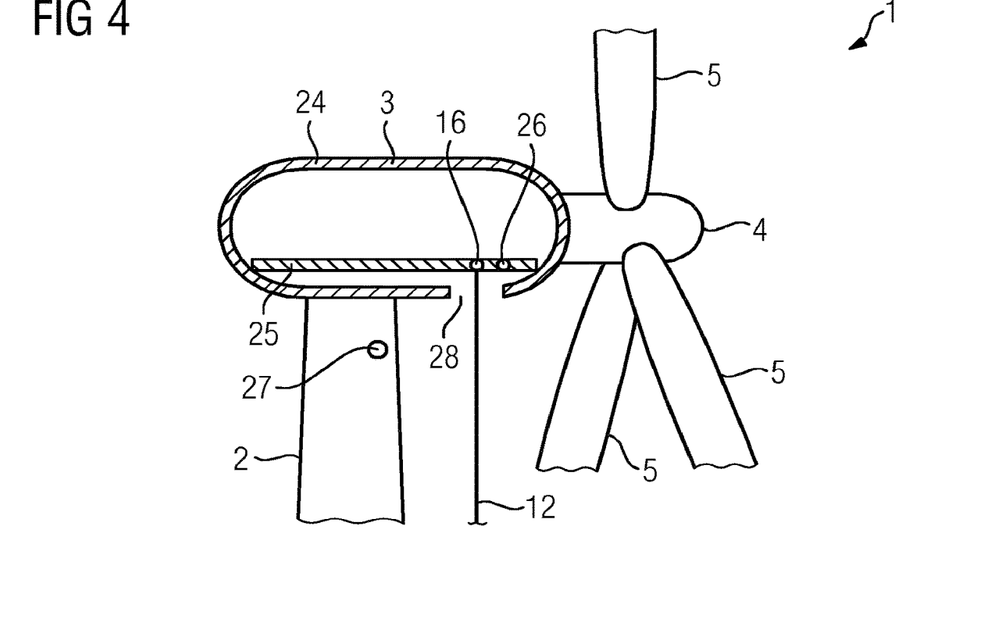
FIG. 4 depicts a cross-sectional side view of a nacelle of a wind turbine.

In FIG. 4, a sectional view of the nacelle 3 of the wind turbine 1 is shown. The nacelle 3 comprises a shell 24, and a bedframe 25, wherein the nacelle 3 is supported by the bedframe 25 on the tower 2 by supporting structures (not depicted). The coupling means 12 is coupled to the fixation site 16, which is located in the nacelle 3. As coupling site 16, for instance a fixation element of the bedframe 25 can be used. Additionally, or alternatively, as fixation side 16, a fixation means attached to the bedframe 25 can be used. To increase the maximum load mountable to the coupling means 12, more than one fixation site 16 can be used. It is for instance possible to use an additional fixation site 26 on the bedframe 25 of the nacelle 3 and/or an additional fixation site 27 on the tower 2 of the wind turbine 1. As fixation sites, fixation means mounted or comprised by the tower 2 and/or the bedframe 25 can be used. To couple the coupling means 12 to the bedframe 25 or to another position inside the nacelle 3, a hatch 28 of the shell 24 of the nacelle 3 can be opened.

The nacelle 3 can comprise a crane, wherein the crane of the nacelle can be used to lift the coupling means 12 and/or the chain hoist 11 to the nacelle 3. However, by fixing the coupling means 12 to the fixation site 16 and/or the additional fixation site 26 and/or 27, the maximum load which can be supported by the tower 2 and therefore lifted by the chain hoist 11 can be increased, so that the chain hoist 11 can lift an object 9 with a larger weight than a crane of the nacelle 3. It is possible that by the chain hoist 11, for instance an object 9 with a weight between one ton and 20 tons is lifted from the platform 6 and are moved to the deck 13 of the vessel 8 or vice versa.

Figure 5:
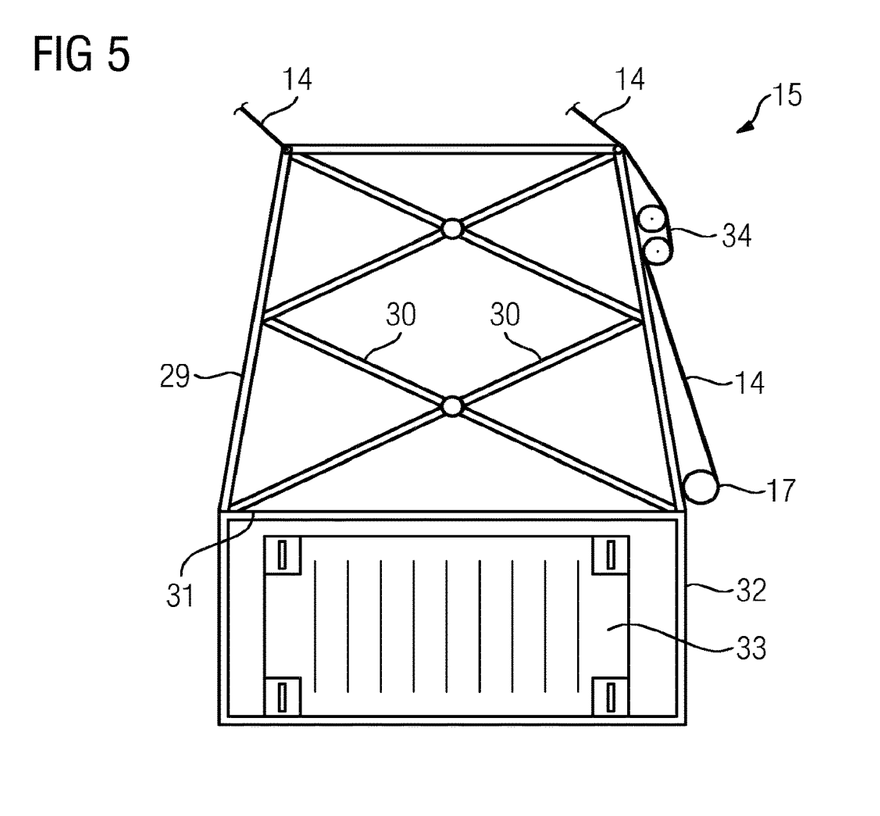
FIG. 5 depicts a front view of an embodiment of a frame structure according to embodiments of the invention.

In FIG. 5, an embodiment of a frame structure 15 is shown. The frame structure 15 comprises a frame element 29 which comprises a trapezoidal cross section. The frame structure 15 further comprises a plurality of stiffening struts 30 stiffening the frame element 29. On a bottom edge 31 of the frame element 29, an attachment arrangement 32 is mounted enabling the attachment of the frame structure 15 to a freight container 33. In this embodiment, the fixation arrangement 32 has been mounted to a bottom side of the freight container 33, so that the frame structure 15 is more stable. It is also possible, that the fixation means 32 is arranged on a topside of the freight container 33, so that the total height of the frame structure 15 can be increased. The frame structure 15 can be coupled to the deck 13 of the vessel 8 using additional fixation means like screws and/or ropes strained between the frame structure 15 and the vessel 8.

The frame structure 15 comprises a winch 17 and a pulley arrangement 34. The frame structure 15 guides the ropes of the pulling means 14 through the pulley arrangement 34 towards the winch 17. By using the pulley arrangement 34, a force created by the winch 17 can be amplified for moving the object 9 coupled to the pulling means 14. It shall be noted that the illustration of the pulley arrangement 34 as well as the winch 17 and the guidance of the pulling means 14 is only schematical.

The freight container 33 can be for instance a 20-foot-container or another type of standard freight container. The freight container 33 can be fixed to the deck 13 of the vessel 8 using standard fixation arrangements for freight containers.

Different to the depiction in FIG. 5, the pulley arrangement 34 and the winch 17 may also be positioned outside of the plane of the frame structure 15. Similar as illustrated in FIGS. 1 and 2, the winch 17 may be positioned "behind" the frame structure 15, seen from wind turbine. The winch 17 and/or the pulley arrangement 34 may also be oriented such that the axis of the winch 17 is parallel to the frame structure 15.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A frame structure for coupling to a pulling means or a puller, wherein the pulling means or the puller is coupled to an object for moving the object between a platform of a wind turbine and a deck of a vessel, the frame structure comprising:
   a frame element coupled to the pulling means or the puller, wherein the frame element comprises an A-shaped or a H-shaped or a trapezoidal cross section; and
   a fixation arrangement connected to the frame element, wherein the fixation arrangement is mounted to or mountable to a bottom side or a topside of at least one freight container located on the deck of the vessel such that the fixation arrangement and the at least one freight container remains stationary with the deck of the vessel as the object is moved;
   wherein the frame structure comprises at least one pulley arrangement and/or at least one winch.

2. The frame structure according to claim 1, wherein the frame structure is connected to the pulling means or the puller.

3. The frame structure according to claim 1, wherein the pulling means or the puller is coupled between the object and the vessel, wherein an electrically actuated hoist coupled between the object and at least one fixation site located above the platform of the wind turbine and the deck is configured to vertically move the object, wherein at least one fixation element mounted to or comprised by a bedframe of a nacelle located on a bottom side of the nacelle is used as the at least one fixation site, and wherein the pulling means or the puller is configured to radially deflect the object from a tower of the wind turbine.

4. The frame structure according to claim 1, wherein the frame structure is arranged on the deck of the vessel and spaces the pulling means or the puller from the deck of the vessel.

5. The frame structure according to claim 1, wherein the pulling means or the puller is guided by the frame structure.

6. The frame structure according to claim 1, wherein one or more ropes and/or cables are coupled to the at least one winch, further wherein the at least one winch is coupled to the frame structure and/or the deck of the vessel.

7. The frame structure according to claim 6, wherein the one or more ropes and/or cables are guided by the at least one pulley arrangement of the frame element.

8. A frame structure for coupling to a pulling means or a puller, wherein the pulling means or the puller is configured to be coupled to an object for moving the object between a platform of a wind turbine and a deck of a vessel, the frame structure comprising:
   a frame element coupled to the pulling means or the puller, wherein the frame element comprises an A-shaped or a H-shaped or a trapezoidal cross section; and
   a fixation arrangement connected to the frame element, wherein the fixation arrangement is mounted to or mountable to the vessel such that the fixation arrangement remains stationary with respect to the vessel as the object is moved;
   wherein the frame structure comprises at least one pulley arrangement and/or at least one winch.

9. The frame structure according to claim 8, wherein the frame structure is connected to the pulling means or the puller.

10. The frame structure according to claim 8, wherein the pulling means or the puller is coupled between the object and the vessel, wherein an electrically actuated hoist coupled between the object and at least one fixation site located above the platform of the wind turbine and the deck is configured to vertically move the object, wherein at least one fixation element mounted to or comprised by a bedframe of a nacelle located on a bottom side of the nacelle is used as the at least one fixation site, and wherein the pulling means or the puller is configured to radially deflect the object from a tower of the wind turbine.

11. The frame structure according to claim 8, wherein the frame structure is arranged on the deck of the vessel and spaces the pulling means or the puller from the deck of the vessel.

12. The frame structure according to claim 8, wherein the pulling means or the puller is guided by the frame structure.

13. The frame structure according to claim 8, wherein one or more ropes and/or cables coupled to at least one winch are used as the pulling means or the puller, wherein the at least one winch is coupled to the frame structure and/or the deck of the vessel.

14. The frame structure according to claim 8, wherein the one or more ropes and/or cables are guided by at least one pulley arrangement of the frame element.

15. A frame structure comprising:
- a frame element, wherein the frame element comprises an A-shaped or a H-shaped or a trapezoidal cross section; and
- a fixation arrangement connected to the frame element, wherein the fixation arrangement is fixed to a vessel floating on a sea, or mounted to a freight container fixed to a deck of the vessel;
- wherein the frame structure comprises at least one pulley arrangement and/or at least one winch.

16. The frame structure according to claim 15, further comprising:
- a pulling means or a puller, wherein the pulling means or the puller is configured to be coupled between an object and the vessel and to radially deflect the object during a lifting operation wherein the object is lifted from the vessel to a platform of a tower of a wind turbine.

17. The frame structure according to claim 15, further comprising:
- a plurality of stiffening struts stiffening the frame element, wherein the plurality of stiffening struts cross from one side of the frame member to the other.

18. The frame structure according to claim 15, wherein the frame element has at least two frame members extending in a generally vertical direction and at least two frame members extending in a generally horizontal direction, wherein a height of the at least two frame members extending in the generally vertical direction exceeds a width of the at least two frame members extending in a generally horizontal direction.

* * * * *